(12) United States Patent
Isaka et al.

(10) Patent No.: US 7,013,263 B1
(45) Date of Patent: Mar. 14, 2006

(54) ONLINE INTERACTION PROCESSING

(75) Inventors: Satoru Isaka, Santa Clara, CA (US);
Wayne Chan, Los Gatos, CA (US);
Thomas Limerick, Pelham, AL (US)

(73) Assignee: Mindfabric, Inc., San Jose, CA (US)

( * ) Notice: Subject to any disclaimer, the term of this patent is extended or adjusted under 35 U.S.C. 154(b) by 868 days.

(21) Appl. No.: 10/104,546

(22) Filed: Mar. 22, 2002

Related U.S. Application Data

(60) Provisional application No. 60/339,452, filed on Oct. 25, 2001.

(51) Int. Cl.
*G06F 17/20* (2006.01)
*G06F 17/21* (2006.01)

(52) U.S. Cl. .............................. 704/9; 707/4
(58) Field of Classification Search .................... None
See application file for complete search history.

(56) References Cited

U.S. PATENT DOCUMENTS

| | | | |
|---|---|---|---|
| 5,109,509 A | 4/1992 | Katayama et al. ............. 704/9 |
| 5,301,314 A | 4/1994 | Gifford et al. ............... 707/101 |
| 5,668,953 A | 9/1997 | Sloo ............................... 705/1 |
| 5,721,832 A | 2/1998 | Westrope et al. ............. 705/27 |
| 5,737,726 A | 4/1998 | Cameron et al. .............. 705/7 |
| 5,799,268 A * | 8/1998 | Boguraev ....................... 704/9 |
| 5,963,916 A | 10/1999 | Kaplan ........................ 705/26 |
| 6,212,494 B1 * | 4/2001 | Boguraev ....................... 704/9 |
| 6,401,118 B1 | 6/2002 | Thomas ...................... 709/224 |
| 6,415,555 B1 | 7/2002 | Montague .................... 52/36.2 |
| 6,564,263 B1 * | 5/2003 | Bergman et al. ............ 709/231 |
| 6,584,464 B1 * | 6/2003 | Warthen ......................... 707/4 |
| 6,595,342 B1 | 7/2003 | Maritzen et al. ............ 194/212 |
| 6,681,223 B1 * | 1/2004 | Sundaresan .................... 707/6 |
| 6,693,236 B1 | 2/2004 | Gould et al. ............. 84/477 R |
| 6,711,589 B1 | 3/2004 | Dietz ....................... 707/104.1 |
| 6,714,939 B1 | 3/2004 | Saldanha et al. ........... 707/102 |
| 6,751,615 B1 | 6/2004 | Nisler et al. .................... 707/5 |
| 6,775,666 B1 | 8/2004 | Stumpf et al. ................. 707/5 |
| 2002/0152200 A | 10/1992 | Krichisky et al. ............. 707/3 |
| 2001/0029506 A1 * | 10/2001 | Lee et al. .................... 707/102 |
| 2002/0138481 A1 | 9/2002 | Aggarwal et al. ............. 707/6 |
| 2003/0014269 A1 | 1/2003 | Malkin et al. ................. 705/1 |

(Continued)

FOREIGN PATENT DOCUMENTS

WO   WO99/45487   9/1999

(Continued)

*Primary Examiner*—David D. Knepper
(74) *Attorney, Agent, or Firm*—Dergosits & Noah LLP

(57) ABSTRACT

Methods and apparatus to process online interactions from numerous sources, coming from different time frames and systems. One embodiment includes a facilitator, an interaction processor, and an action generator. The facilitator facilitates interactions in one or more devices, where interactions typically occur. The processor can consolidate and analyze interactions from multiple sources, in different formats, and collected at different time frames, to extract intelligence from them. The processor processes such interactions, and generates an interaction descriptor for each interaction. A descriptor can include a generalization of the corresponding interaction, and at least a part of the interaction. Descriptors for different types of interactions can be represented by the same format to allow the processor to analyze them together. The action generator can improve on future interactions; refer an interaction to be responded by a human representative if necessary; and allow users to extract information from the analysis, and generate reports regarding the interactions. Future interactions can then be significantly enhanced, with customers having higher satisfaction level, and companies more accurately charting their future.

20 Claims, 13 Drawing Sheets

U.S. PATENT DOCUMENTS

| | | | |
|---|---|---|---|
| 2003/0023515 A1 | 1/2003 | Kon | 705/27 |
| 2003/0024981 A1 | 2/2003 | Narasimhan | 235/383 |
| 2003/0028438 A1 | 2/2003 | Smukowski | 705/26 |
| 2003/0050865 A1 | 3/2003 | Dutta et al. | 705/27 |
| 2003/0126044 A1 | 7/2003 | Brooks | 705/28 |
| 2003/0126095 A1 | 7/2003 | Lee | 705/80 |
| 2003/0158793 A1 | 8/2003 | Takakura et al. | 705/27 |
| 2003/0200157 A1 | 10/2003 | Krajec | 52/36.2 |
| 2003/0208396 A1 | 11/2003 | Miller et al. | 705/14 |

FOREIGN PATENT DOCUMENTS

| | | |
|---|---|---|
| WO | WO99/6770 | 12/1999 |
| WO | WO99/66427 | 12/1999 |
| WO | WO02/10961 | 2/2002 |

\* cited by examiner

ONLINE INTERACTION PROCESSING

CROSS-REFERENCE TO RELATED APPLICATIONS

This application claims benefit of U.S. Provisional Patent Application No. 60/339,452, filed Oct. 25, 2001, entitled "ONLINE INTERACTION PROCESSING," and hereby incorporated herein by reference for all purposes. Co-pending U.S. patent application No. 10/214,189, filed Apr. 16, 2002, entitled "SELF-HELP PRODUCT LOCATOR," also claims the benefit of U.S. Provisional Patent Application 60/339,452.

BACKGROUND OF THE INVENTION

The present invention relates generally to processing online interaction and more particularly to process different modes of online interactions.

Corporations are increasingly interacting with their customers online. More and more people are going online to get information, buy products and obtain support. The number of Internet users surpassed 400 million in 2000 and will continue to grow to reach 1.17 billion by 2005. In addition, wireless devices, such as cell phones and personal digital assistants, are significantly penetrating into the corporate operations. By 2005, more people will be accessing the Internet wirelessly than through the landlines. Corporations are bombarded by online interactions from many different fronts. Information embedded in these interactions is extremely valuable. They guide corporations to understand their customers and chart their own future.

Most people go to corporate sites for specific purposes, and corporations have to respond appropriately. One approach is through call centers. On average, it costs a company about $33 to respond to a single call. Not only is it expensive to operate call centers, the employee mobility of such centers is high. Typically, these employees do not stay for more than six months. They are the front line soldiers interfacing directly with customers. With such a high mobility rate, it is challenging to maintain a solid group of well-trained staff.

A number of companies try to reduce cost with automatic response or self-help systems. Such systems are much cheaper than systems based on direct contacts with customer support personnel. They typically cost in the order of less than $1 a call. Also, they function 24 hours a day and 7 days a week, and they can respond to at least a portion of the interactions.

However, typical automatic systems only focus on one type of interactions, such as self-help or email. Corporations should have a unified view of customer interactions. If a customer asks a question through email, he should get the same response as from self-help through his browser.

There are companies trying to provide systems to give the same answers for different types of interactions. Their approach is to transform different types of interactions into a specific format. For example, through an email and through a chat session, a user asks a question, "Where are you located?" Their system transforms both interactions into the same format. Then they respond to that same format. Presumably, such a system can help them resolve the challenge of inconsistent responses from different systems. As in other instantaneously responding systems, if they can accurately respond to 30% of incoming inquiries, they are already a money saver and may be considered a success.

In recent years, a field known as customer relationship management (CRM) has flourished. The goal of a CRM system is to allow companies to track customers, monitor revenue and expenses and target marketing prospects more accurately. The CRM market has grown from $500 million in 1996 to $6 billion in 2001. To save money, many companies are using self-help as a part of their CRM systems to respond to their customers instantaneously. Such automatic response systems are becoming more pervasive in the industry.

Systems that focus on providing instantaneous responses to customers are emphasizing on the 24/7 auto-response aspects of the systems. However, such systems have weaknesses.

Focusing on providing instantaneous responses addresses a real need in the industry. But such quick results are not always accurate or appropriate. Also, since quick response is the goal, such systems do not handle information previously collected from different systems. Unfortunately, 90% or more of corporate information is the latter type. They were previously collected, at different time frames and in many different formats/protocol. They can be located in diverse geographical locations. To really understand customers, corporations should consolidate and analyze current and past information together.

Not only can aggregating such information help corporations better understand their customers, they can help corporations improve on their response systems. For example, a corporation has a CRM system with self-help dialog boxes, email support and kiosks. A customer is interested to buy a personal computer, but does not know what type. He can go to the corporate Web site, identify himself and ask for personal computers from the corporation's search dialog box. Assume the search dialog box on the site responds with a bad answer. A day later, the customer emails a similar inquiry to the corporation, and gets an email response. Then, an hour later, the customer goes to the corporation's kiosk and orders the computer. It would be very advantageous if the CRM systems can analyze all of the above interactions together from the three touch points—the search dialog box, the email system and the kiosk. Based on the analysis, the system can conclude that (a) the email response enhances the final sale; and (b) the search dialog box's response was defective in responding to questions on personal computers.

Online interactions are coming into corporations in different protocols, and from different time frames and physical systems. Some of the interactions can be stored in a database. Other interactions can be in writing and stored in word documents. Interactions can be occurring now, or might have occurred two weeks ago. To understand customers, corporations need to consolidate as many interactions as possible current and past, local and remote—and analyze them appropriately. From the understanding, corporations would be able to better serve their customers, determine what products to make and, in turn, chart their future. Corporations have to be able to intelligently and accurately extract such knowledge from the avalanche of online interactions. It should be apparent from the foregoing that this is a big challenge.

SUMMARY OF THE INVENTION

In one embodiment, the present invention provides methods and apparatus to understand online interactions from numerous sources, coming from different time frames and systems. Based on this understanding, corporations can significantly enhance their customer satisfaction level, and more accurately set their own directions. Through the invention, corporations can also access and reuse their knowledge capital within their extended enterprise.

One embodiment of the invention includes an interaction processor to process the interactions. Interactions can be in different protocols, captured at different times, and collected from different systems. One system can be a mobile device and another system can be a desktop device. One interaction can be in real time, such as self-help systems on a Web site, and another interaction can be in non-real time, such as email. Through grammatical and semantic processing, the interaction processor generates an interaction descriptor for an online interaction.

In the embodiment, each descriptor has one or more attributes, with at least one attribute related to a generalization of its corresponding interaction. A descriptor can include at least a part of its corresponding interaction, which keeps specifics in the interaction.

As an example, the interaction is as follows:
Satoru asks through self-help on a Web site, "How do I download a new software from your Web site?"
Wayne answers through instant messaging, "Go to the software section on the site, and select download."

One generalization for the interaction can be that the interaction is on technical support, and a specific can be Satoru's entire question, or a transcript of the question. Descriptors for different interactions can be of the same format to allow the processor to more efficiently analyze them together.

The processor then analyzes a number of descriptors to determine a piece of information related to the corresponding interactions. That piece of information can provide an understanding in the interactions. Based on the understanding, corporations can improve their interactions with their customers, and set their future directions.

One embodiment also includes an action generator, coupled to the processor. The action generator can have an interaction enhancer, a report generator and an escalator. Based on the analysis by the processor, the interaction enhancer can improve on future interactions; the escalator can refer an interaction to be responded by a human representative; and the report generator can allow managers to extract information from the analysis and generate reports regarding the interactions.

Another embodiment can include a facilitator, also coupled to the processor. The facilitator is for facilitating interactions in one or more devices. For example, the facilitator can include a natural-language system. A user enters a natural-language question into one of the devices, which directs the question to the facilitator. The natural-language system automatically produces a response to the natural-language question. After responding to the question, the natural-language system can store information related to the interaction, such as the question and the answer, in a storage medium. The processor can access the interaction stored. Both the interaction enhancer and the escalator can be coupled to the facilitator for better user satisfaction.

As explained, at least in one of the embodiments, the interaction processor can consolidate interactions from multiple sources, in different formats, and collected at different time frames, to extract intelligence from them. Based on the analysis, future interactions can be significantly enhanced, customers can have higher satisfaction level, and companies can better chart their future.

Other aspects and advantages of the present invention will become apparent from the following detailed description, which, when taken in conjunction with the accompanying drawings, illustrates by way of example the principles of the invention.

Same numerals in FIGS. 1–10 are assigned to similar elements in all the figures. Embodiments of the invention are discussed below with reference to FIGS. 1–10. However, those skilled in the art will readily appreciate that the detailed description given herein with respect to these figures is for explanatory purposes as the invention extends beyond these limited embodiments.

DETAILED DESCRIPTION OF THE INVENTION

The present invention can process different types of online interactions possibly collected from different time frames and from different systems. In one embodiment, an interaction typically includes a statement transmitted from a source to a recipient, with the statement recorded. The recipient may be an intended recipient or an un-intended recipient. An intended recipient can be the recipient the source intends to send the statement to. In another embodiment, an interaction includes a statement and a response to the statement. The response can be just an acknowledgment of receiving the corresponding statement.

The term, online, in general, implies coupling to an electronic device or available through an electronic device. As an example, online self-help support is a type of support one can receive from a computer or a cellular phone, without the need to read a menu. In another example, a call center can provide customers with product information electronically.

Figure 1:
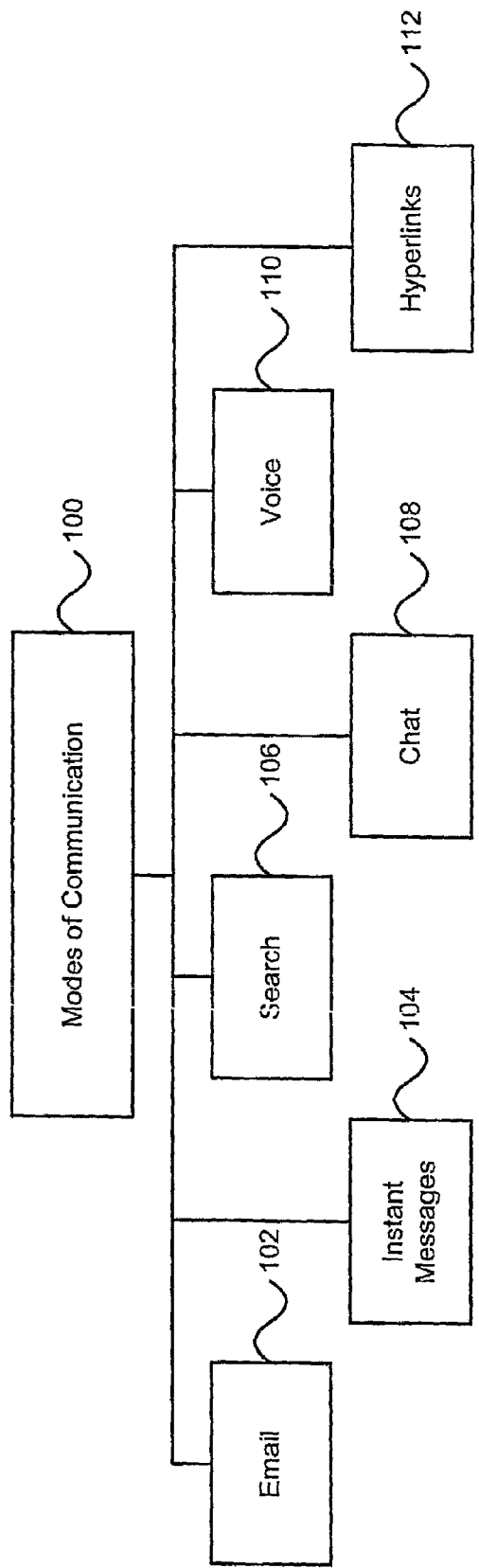
FIG. 1 shows examples of modes of communication for the present invention.

FIG. 1 shows examples of different modes or types of communication, 100, for a number of embodiments of the present invention. The interactions can be an email, 102, an instant message, 104, an online search, which can be an online self-help, 106, an online chat, 108, voice interactions, 110, hyperlinks, 112, and fax. The online chat does not have to be with a real person. It can be with a virtual person. Similarly, voice interactions can be with an interactive voice response system. Some of the modes of communication can be using voice over IP technology. In one embodiment, hyperlinks can also be a form of interactions. The statement here is the desire to go to a destination through one or more clicking actions, and the response can be the desired Web page. The interactions can also be through a form with many entries. One submits the form to a recipient. In one embodiment, a mode of communication is a method of interaction that helps communication between two devices.

Some of these interactions are real-time, which can be defined as an interaction where the response is sent back to the original statement almost immediately after the statement is received. For example, online search or online self-help with automatic responses and hyperlinks can be considered as real time. Some interactions are non-real time. Emails and faxes can be considered as non-real time because actual responses, not just an acknowledgment of receiving a question, to emails and faxes can be minutes or even days away from the original questions.

Some features in interactions may not be recorded. In one embodiment, a facilitator captures interactions as they occur, but may not capture all attributes of the interactions. Whatever captured by the facilitator can be considered as a part of the interactions. An interaction can be a transcript of the interaction, a recording of the interaction, or an electronic copy of whatever transpired during the interaction. For example, as a user is communicating, the rate of his heart beat increases. This piece of information may not be recorded by the facilitator. Interactions recorded can be different if they are captured by different devices. If the capturing medium is a query box on a computer terminal, the interaction recorded is the text entered. If the capturing medium is a video camera, the interaction recorded can be depicted by images on a videotape. As another example, if the interaction includes the smell of a toxic gas, the interaction can have data from the output of an electronic nose.

Figure 2:
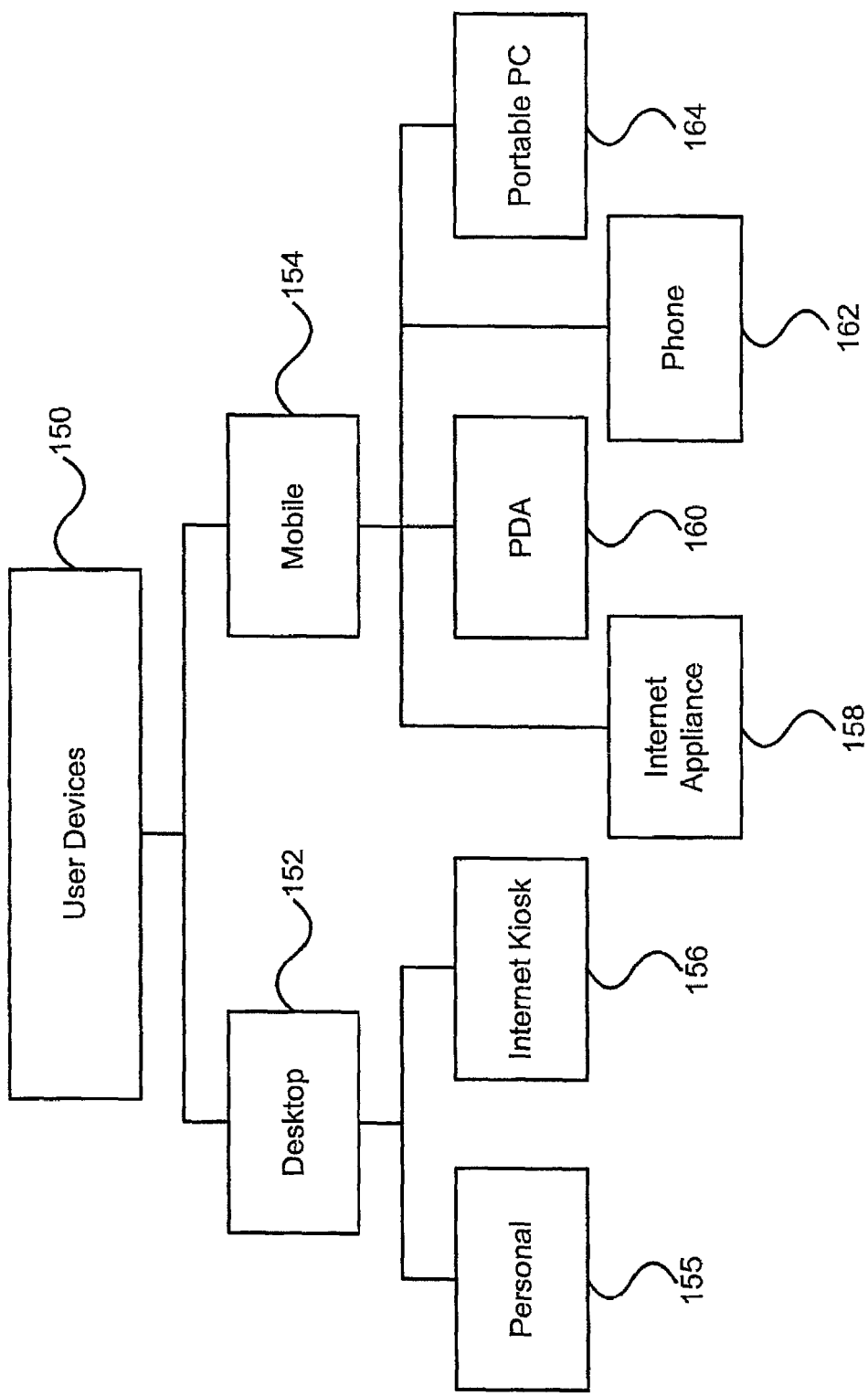
FIG. 2 shows examples of electronic devices for online interactions in the present invention.

FIG. 2 shows examples of user devices, 150, for the online interactions in different embodiments. One can be using a desktop device, 152, or a mobile device, 154, to interact. The desktop is typically stationary when in use, and can be a personal computer, 155, which may have a Web browser. The desktop device can also be an Internet kiosk, 156, an automatic teller machine, or a television. The mobile device, 154, can be an Internet appliance, 158, a personal digital assistant, 160, a palm-based device, a phone, 162, a data phone, a cellular phone, a portable personal computer, 164, a wearable computer, a hand-held computer, a pager or other types of wireless devices.

Figure 3:
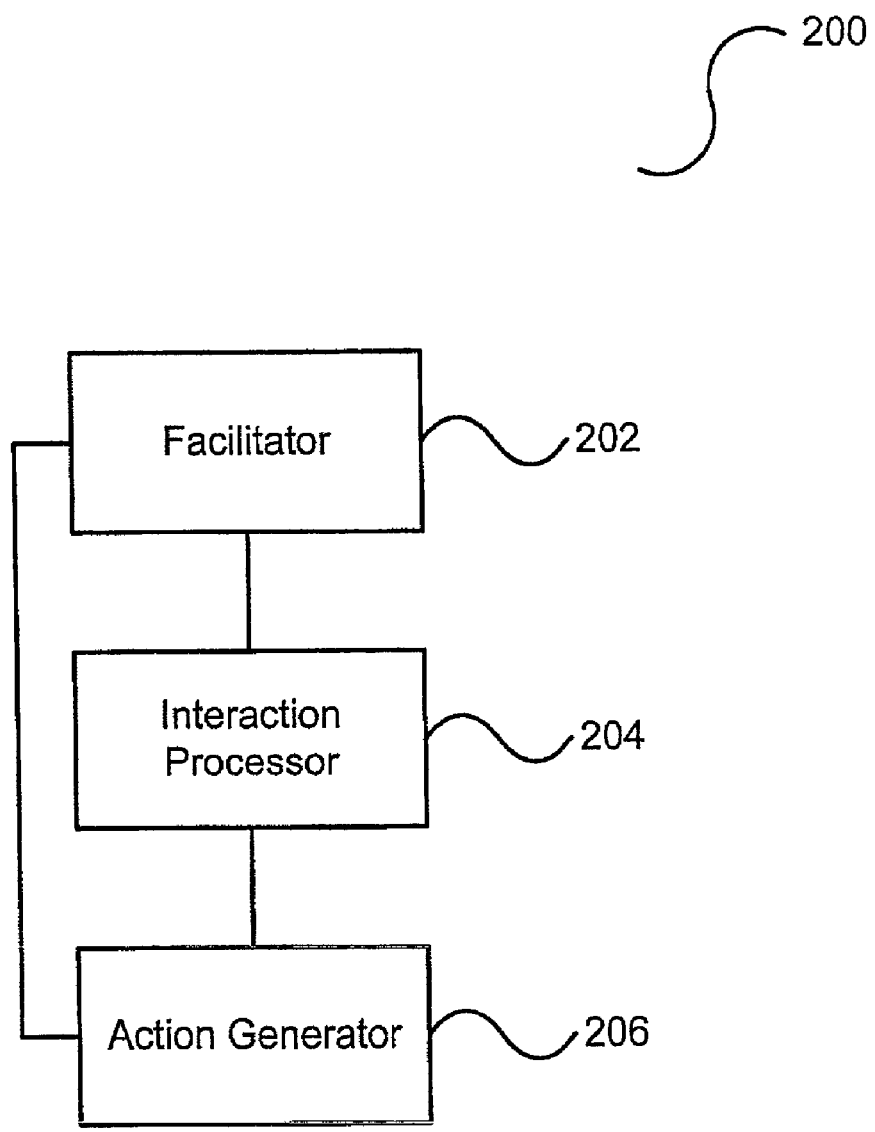
FIG. 3 shows one embodiment to implement the invention.
Figure 4:
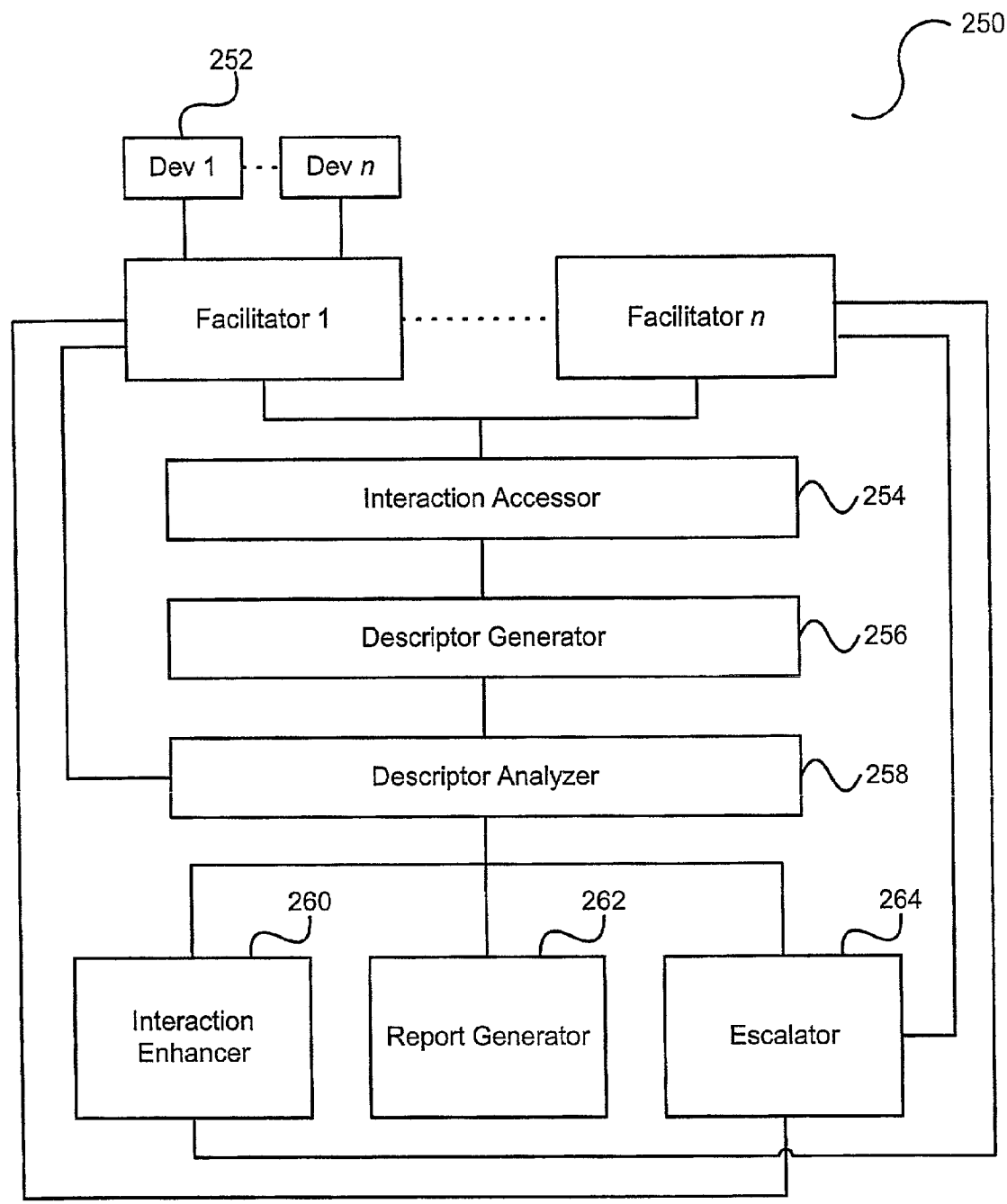
FIG. 4 shows a more detailed illustration of an embodiment to implement the invention.
Figure 5:
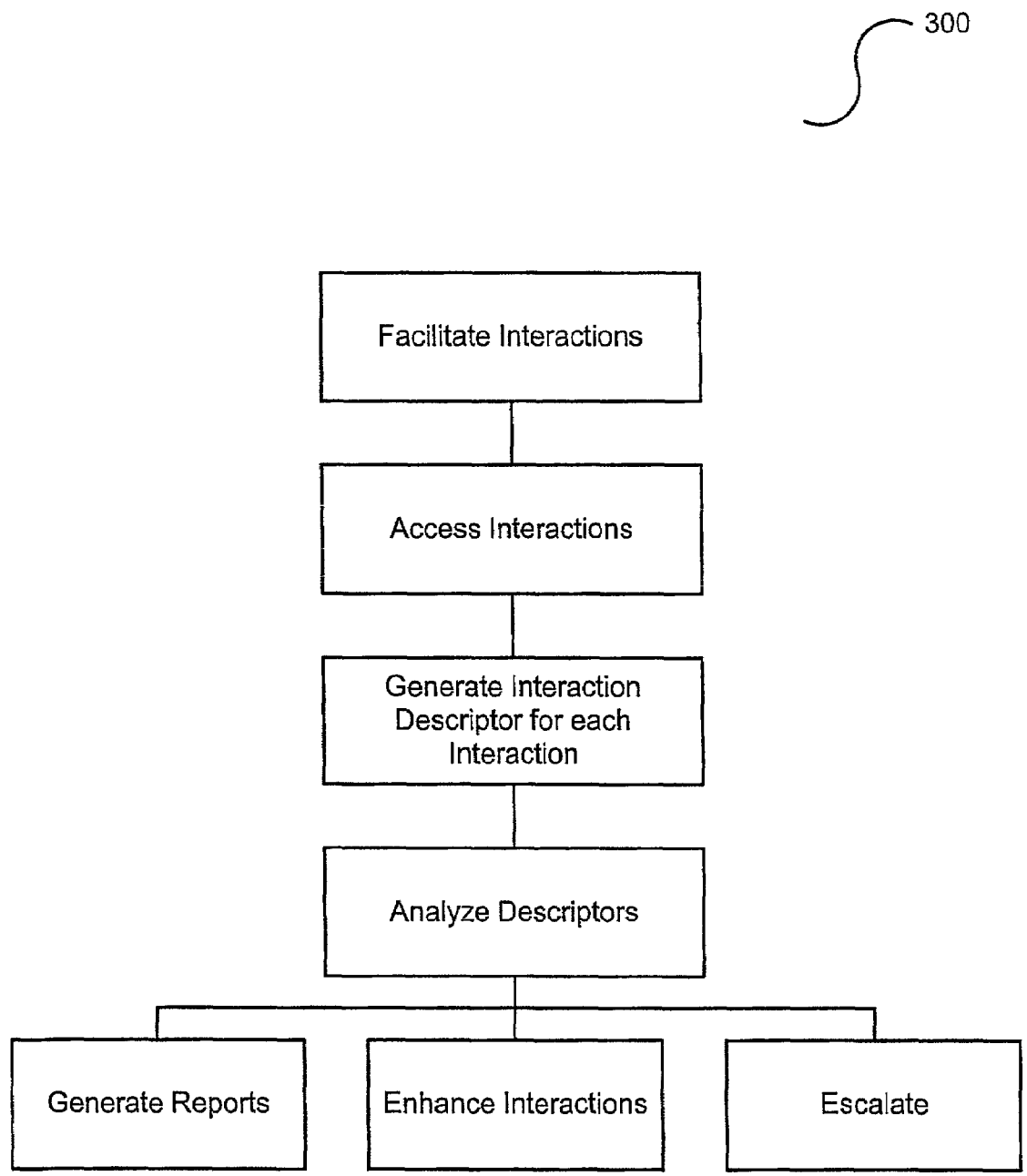
FIG. 5 shows one set of steps to implement one embodiment of the invention.

FIG. 3 shows one embodiment, 200, to implement the invention. FIG. 4 shows a more detailed description of an embodiment, 250, while FIG. 5 shows a set of steps, 300, illustrating one embodiment of the invention.

The embodiment shown in FIG. 3 includes a facilitator, 202, an interaction processor, 204, and an action generator, 206. Another embodiment only includes the interaction processor, or the interaction processor with the action generator. The following describes each part in general terms. A facilitator, electronically coupled to one or more devices, 252, serves to facilitate interactions in the devices. The facilitator can also include a storage medium to store the interactions, which can be a representation of the interaction. Note that different types of interactions may be stored in different formats. The interaction processor can be coupled to one or more facilitators. The processor can include an interaction accessor, 254, a descriptor generator, 256, and a descriptor analyzer, 258. The interaction accessor accesses the interactions, which can be in a facilitator's storage medium. After accessing the interactions, the descriptor generator generates an interaction descriptor for each interaction. Then the descriptor analyzer analyzes the descriptors for the action generator, 206. The generator can include an interaction enhancer, 260, a report generator, 262, and an escalator, 264. Outputs from the interaction enhancer can improve future interactions. The report generator can generate different types of reports regarding the interactions. A person can work with the report generator to analyze the data and to generate different reports. The escalator, 264, can escalate an interaction. For example, if an inquiry shows intense frustration, the escalator can automatically refer the inquiry to a customer support representative, who can respond to the inquiry in person.

The above embodiment can be implemented in a stand-alone computer, with, for example, software and hardware. One embodiment of the computer can include a bus connecting a number of components, such as a processing unit, a main memory, an I/O controller, a peripheral controller, a graphics adapter, a circuit board and a network interface adapter. The I/O controller can be connected to components, such as a harddisk drive and a floppy disk drive. The peripheral controller can be connected to one or more peripheral components, such as a keyboard and a mouse. The graphics adapter can be connected to a monitor. The circuit board can be coupled to audio signals. The network interface adapter can be connected to a network, which can be the Internet, an intranet, the Web or other forms of private, public or private-public networks. The processing unit can be an application specific chip.

In one example, a device facilitated by the facilitator can include a monitor and a keyboard, and the facilitator can include a processing unit, with information stored in a main memory. The device and the facilitator can be in different computers. For example, the device is a client computer, which can be a thin client computer. The facilitator is embedded in a server computer. There can be a number of devices in different client computers, all coupled to the server computer. Each client computer can communicate to the server computer through a communication link, or a computer network. In one embodiment, the network can include one or more of the following: The Internet, an intranet, an extranet, a wireless network, or other types of private-public networks. The different computers can have similar capabilities, as in a peer-to-peer network.

Different components may be implemented in different physical components. For example, the interaction accessor and the descriptor generator can be in a first computer, the descriptor analyzer in a second computer, and the action generator in a third computer. All three computers can be coupled together by one or more networks. Some of the components can also be implemented in a middleware apparatus. Note also that different portions of some of the above-described components can also reside in different computers.

Different parts of the invention can be in hardware or software, or can be on a circuit, such as a field-programmable-gate-array, where the program embodying the processes is burnt into the circuit. One or more of the components can be embedded as computer readable code on a computer readable medium, such as CD-ROMs and carrier waves. The medium can be stored in a distributed computer systems or in multiple physical storage units.

Figure 6:
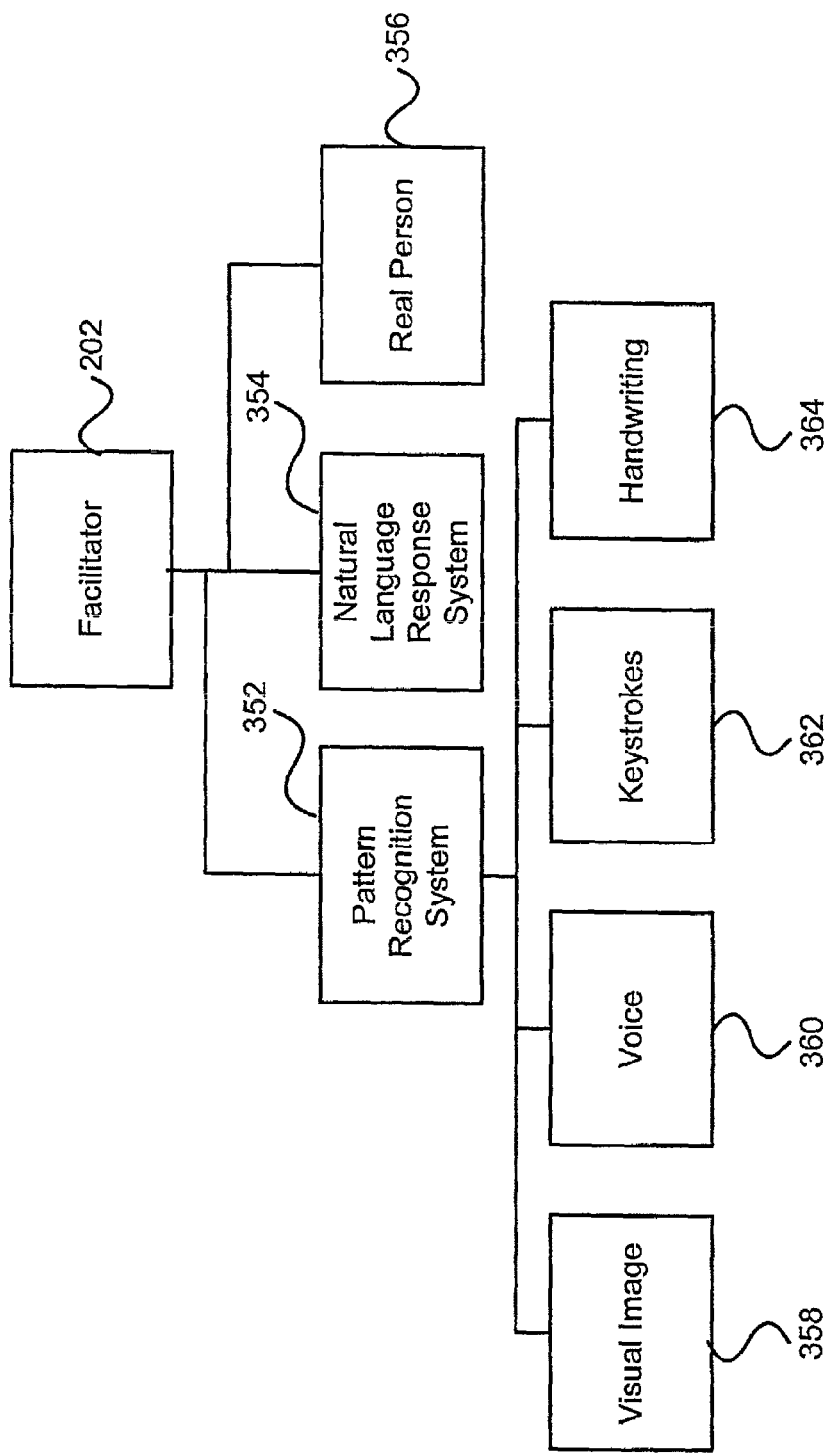
FIG. 6 shows examples of facilitators for a number of embodiments of the present invention.

FIG. 6 shows a number of embodiments for a facilitator that can help the interactions. It can include a pattern recognition system, 352, for visual images, 358, voice patterns, 360, handwritings, 364, or key strokes, 362. Through the system, the facilitator recognizes the interactions, or transforms the interactions into another representation for analysis. Through the analysis, interactions can be facilitated. For example, the system can convert voice patterns or handwritings into written text. In another example, the system can recognize simple keystrokes. One can be using a mouse to click a hypertext link. The system recognizes from the keystrokes that one is activating a certain link.

The system can include a natural language response system, 354, that can analyze information or texts grammatically and semantically. A typical natural-language system includes a knowledge base. Through grammatical analysis, it can, for example, identify one or more phrases in a sentence. Then, based on semantic analysis, it can link phrases to categories in the knowledge base. Depending on the categories identified, the system can act accordingly. For example, the system identifies a user query to be in the category of action movies in San Jose tonight. The system can then bring the San Jose cinema Web site to the users browser. Responses to the natural-language system typically depend on the contents in the knowledge base. By changing the content, the system can give different responses. Implementing a natural language response system should be known to those skilled in the art, and will not be further described. For additional discussion on natural language processing, one is referred to U.S. Pat. No. 5,934,910. One is also referred to U.S. patent application Ser. Nos. 09/347,184 and 09/387,932, which are incorporated by reference into the present application.

In anther embodiment, the facilitator includes a real person, 356, who may be directly talking on the phone, or responding to emails, instant messages or chats. He may also have access to a self-help question and answer system. A user can be communicating with him on the phone. The real person, who can be a call center staff, can be entering the user's questions into his system to get a number of suggested responses from the self-help question and answer systems. The support personnel can follow some of the suggestions to respond to the user. He can also be using a key word search system or a list of frequently-asked questions and answers to respond to the user. Such a system helps speed up his response to the user.

In addition to facilitating the interactions, the facilitator can also automatically store all of the interactions it facilitates in a storage medium. If the interactions are through the telephones, the voice patterns can be stored, or the corresponding text can be stored through a voice recognition system.

Figure 7:
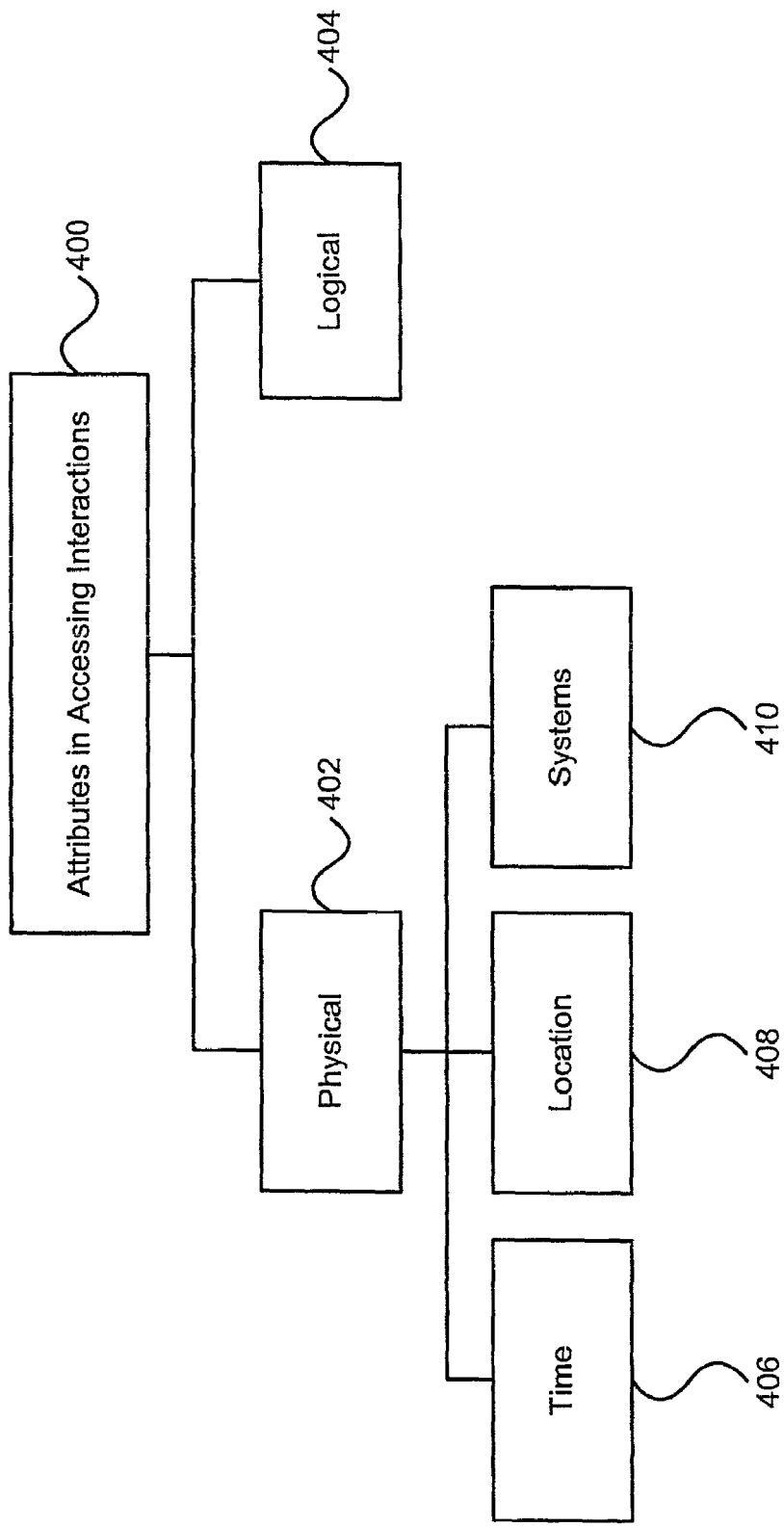
FIG. 7 shows examples of interaction attributes considered in accessing the interactions in the present invention.

FIG. 7 shows examples of interaction attributes, 400, considered by an accessor in accessing the interactions. In general, one set of attributes is physical, 402, which is related to bringing the interactions from the facilitator to the interaction processor; and the other being logical, 404, which is related to identifying which part of the received data or information is for what purpose.

Regarding physical attributes, one attribute involves time, 406. Some of the interactions can be occurring at that instant—in real time or in the same session. Some the interactions might have occurred some time ago. Another attribute involves location, 408. Different interactions may be stored in different media, and in different physical locations, some being remote and other being more local. Yet another attribute involves systems, 410. Different interactions can be from different types of systems, such as one in a Web server, and the other in an interactive voice response system. They can have different storage formats and transport protocols. For example, they can be stored as a flat file in ASCII, or in a relational database format. They can be transferred through different types of protocols, such as HTTP, SMTP or FTP. As another example, the physical access can be done wirelessly or through wire connections, and can be performed through file transfer from the facilitator's storage medium to the accessor.

Regarding logical attributes 404, different data or information accessed can have different data formats. A web server file can include clicks, hyperlink objects and machine responses. The file can also include time to process a request, and error codes, if any. A search log can include user input queries, machine responses (intermediate and final), and performance metrics. A conversational transcript can include the entire conversational record. The accessor can identify the purposes or the logical purposes of different portions of the data accessed, and separate them accordingly.

For structured and un-structured data, the data formats can be identified in different ways. As an example, if the data is represented in XML format, the context-sensitive tags can identify the logical purposes or attributes of different portions of the data accessed. If the data is in a relational database format, its metadata can identify attributes in the data. For un-structured data, in one embodiment, an administrator may create a template for the data before the data is analyzed. For example, the data is a Web server log, keeping track of the Web server activities. A template can be created identifying the logical purposes of different sections of the Web server log, such as user agent information that indicates the operating system and the browser version that the user is using. In another embodiment, if the un-structured data is in a standard format known to those skilled in the art, then no template needs to be specifically created for the data.

After accessing the interactions, depending on the accessor's operating system, in one embodiment, the accessor re-writes the accessed information into its own storage medium.

Figure 8:
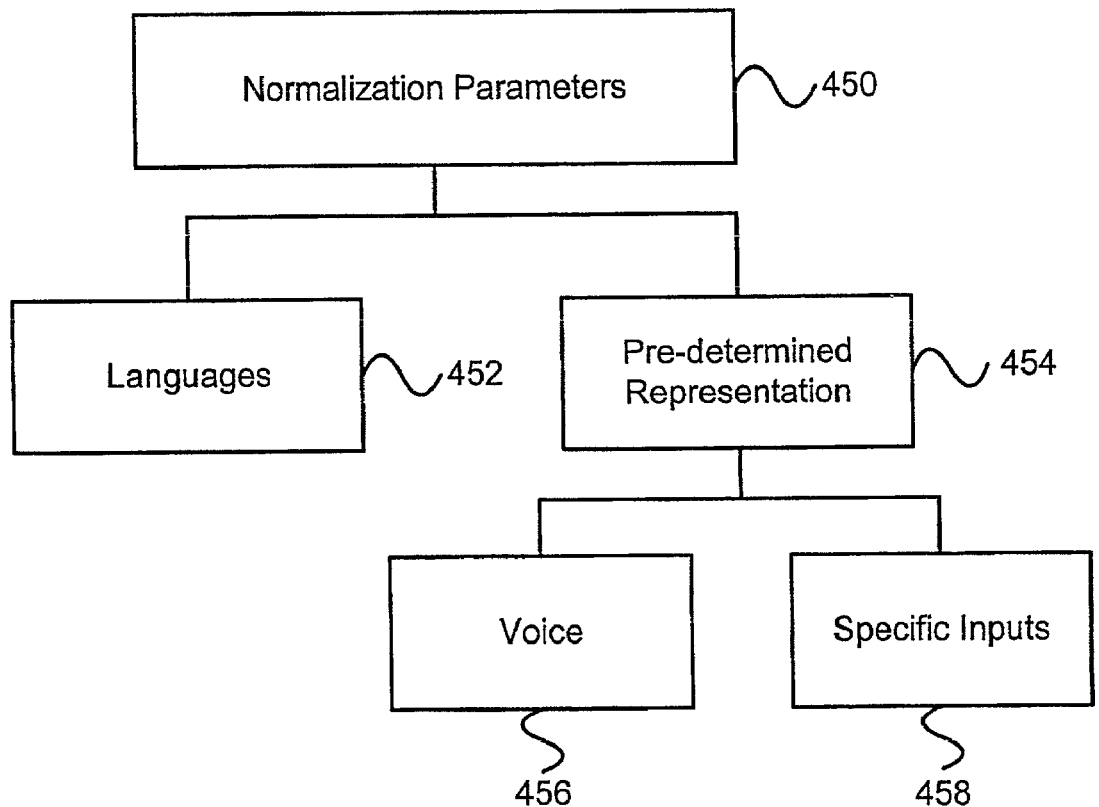
FIG. 8 shows examples of parameters in the interactions being normalized in the present invention.
Figure 9A:
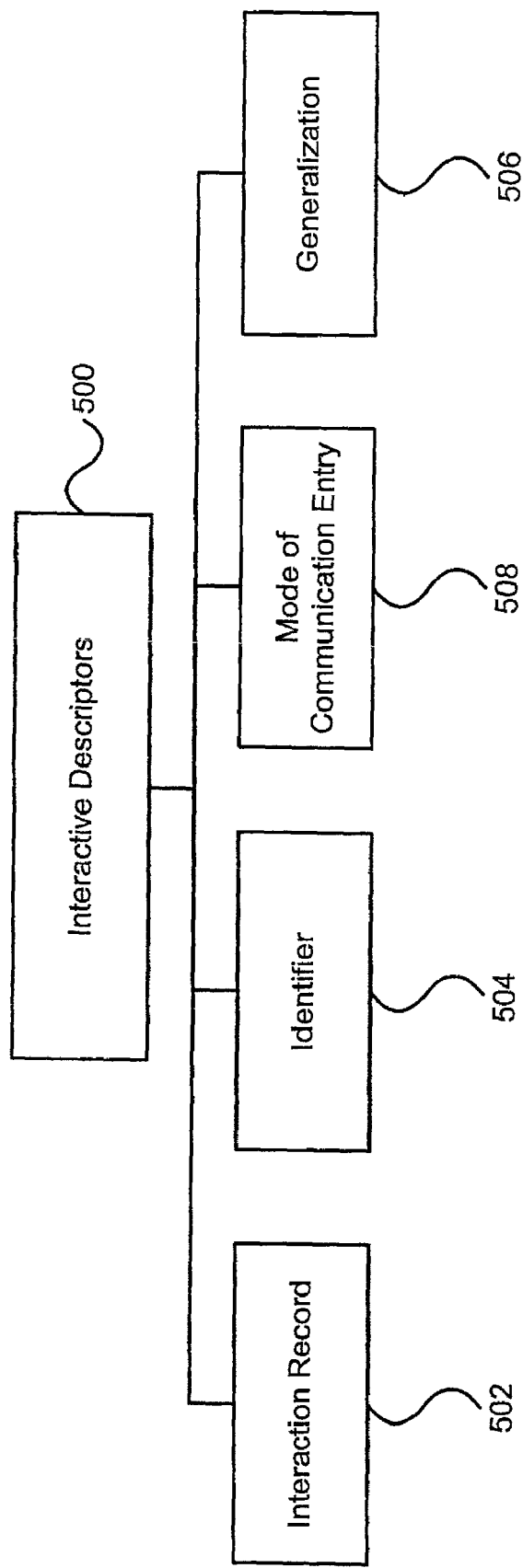
FIGS. 9A–D show examples of features captured in an interaction descriptor in the present invention.
Figure 9B:
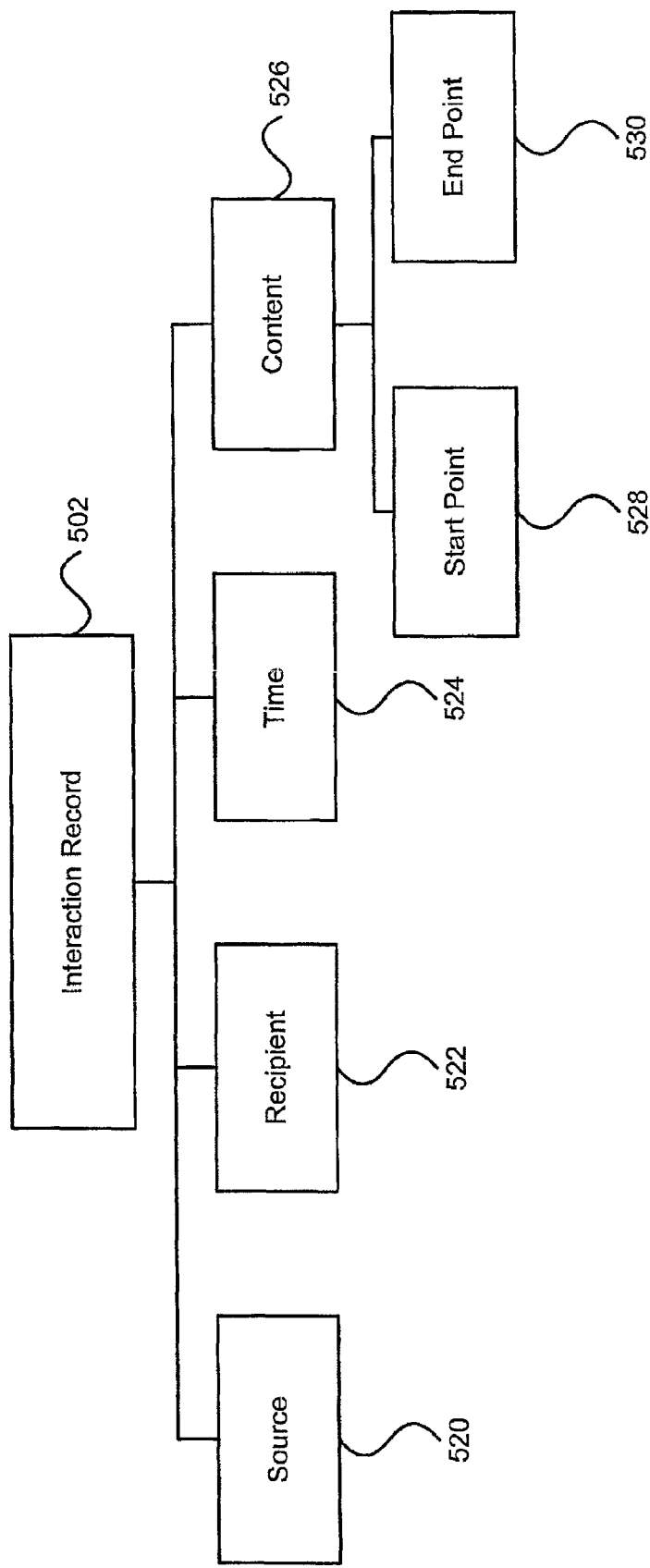
Figure 9C:
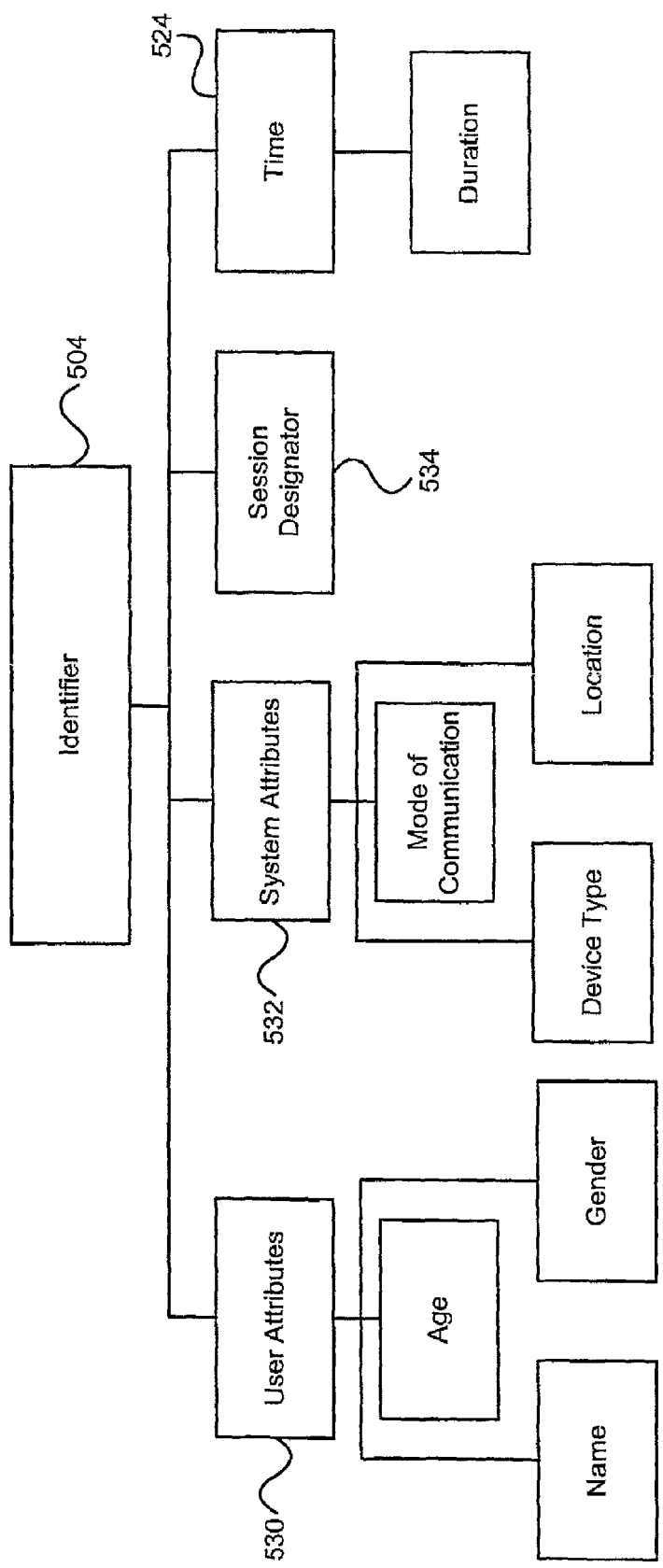
Figure 9D:
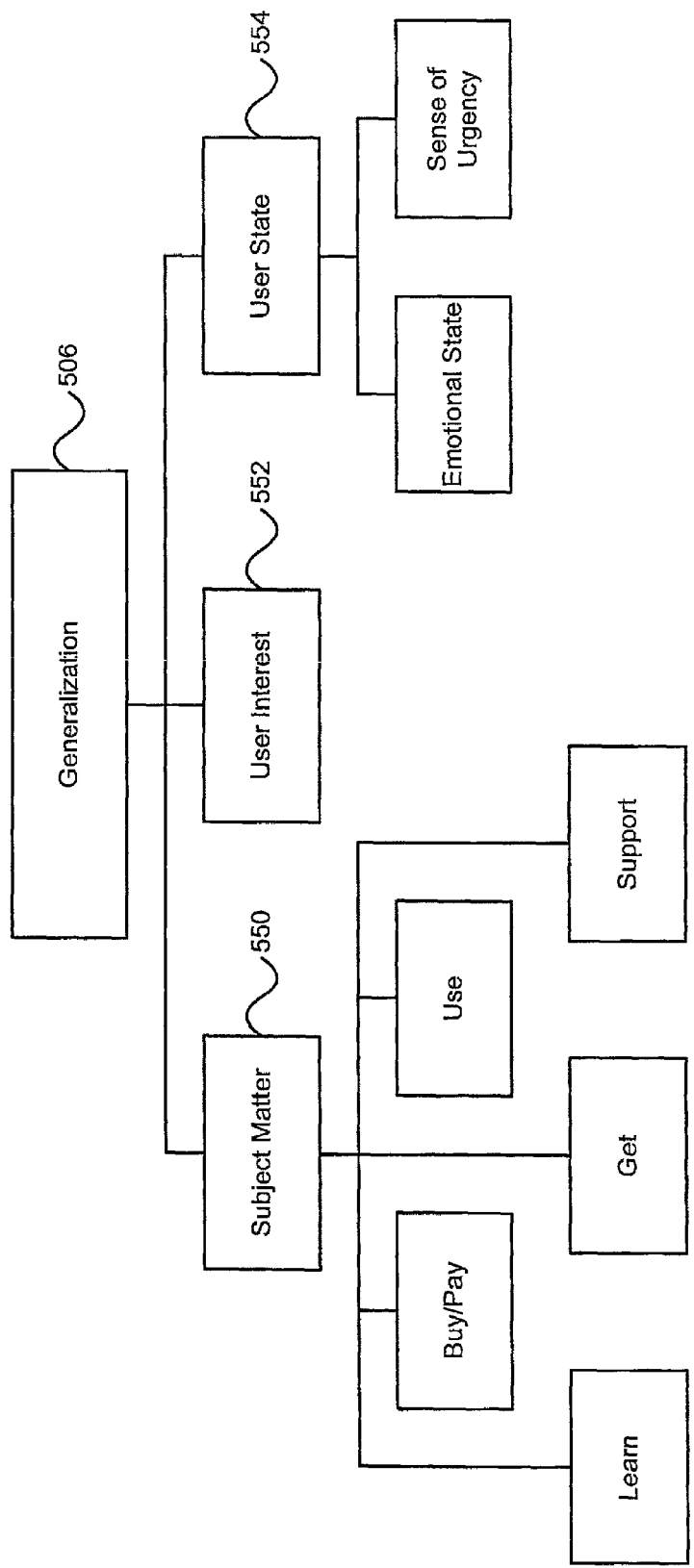

In one embodiment, the interactions collected are normalized by the descriptor generator. FIG. 8 shows examples of normalization parameters, 450. One such parameter relates to languages, 452. The interactions can be in different languages. The normalization process may be converting all of the interactions into English. Another one of such parameter involves pre-determined representations, 454. The normalization process may be converting or normalizing the pre-determined representation into a standard representation. For example, one interaction is in voice, 456, and another in written text. Voice, 456, is a type of representation that can be transformed by voice recognition systems into written texts, which can be interpreted by a text editor. In this case, the written texts can be the standard representation. Another example of pre-determined representations is specific inputs, 458. A button on an Internet kiosk can represent that the user wants to buy a product. Pushing that button represents an interaction with the statement being a buy indication. A response to the statement shown on the screen of the kiosk can be, "If you are interested in paying for the hammer using a credit card, please push the RED button." The RED button would be another pre-determined representation, whose standard representation can be "Pay by a credit card". In yet another embodiment, normalization includes removing some information from the interactions, such as copyright statements on a Web page, or in another example, MPEG files.

The descriptor generator can generate an interaction descriptor for each interaction. In a general sense, interaction descriptors represent interactions of different types and from different systems in a common format. After the standardization, the descriptor analyzer analyzes them.

FIGS. 9A–D show examples of features captured in an interaction descriptor 500. In one embodiment, each descriptor includes an interaction record, 502, or at least a part of its corresponding interaction. This record can be a transcript of the interaction. Through the record, the corresponding interaction, or a part of the interaction, can be reproduced. This record can include the source or the initiator, 520, and the recipient, 522, of the interaction; the time, 524, the interaction occurred, including the start time stamp and the end time stamp; and the content, 526, of the interaction. The recipient can be the recipient intended by the source. In one example, the recipient is the recorder keeping a record of the interaction. In this case, the recipient can be an unintended recipient of the interaction. As an example on content, if the content relates to Web contents, the content of the interaction can be the start point, 528, the end point, 530, and the path length of the surfing path. In one example, an interaction record keeps track of every state in an interaction, as in a state machine.

A descriptor can also include one or more identifiers, 504, serving as identifications for identifying the corresponding interactions. An identifier can be related to an attribute of the user, 530, initiating the statement of the interaction. The attribute can be the name of the user. This user can be a customer using a self-help system; a student sending in an email question; or a company technician using instant messaging to get support, while fixing the company's engine in the field. Examples of other user attributes include his age and gender. Another type of identifier is an attribute of the system, 532, used in the interaction. This attribute can identify the type of device, the mode of communication and the location of the device, such as its IP address. Another identifier relates to the time, 524, of the interaction, such as the start time stamp and the duration of the interaction.

Yet another identifier can be a session designator, 534, which designates the session the interaction is in. A session can be defined in a number of ways. A session can include just one interaction. For example, a user sees a book he wants to buy on a Web site. He clicks the buy button and the corresponding facilitator acknowledges it. This can be a session. If the interaction is through email, then a session can be the email one sent and the receipt of the email. If the interaction is through phone, then a session can be from the start to the end of a call. A facilitator can define a session, such as the number of interactions to be included in it. For example, a session includes all of the interactions in buying a book. It can include identifying the book, entering his charge card number, and entering his address. All of these interactions can be included in the session of buying the book, as defined by the facilitator. There can also be a hierarchy of sessions. For example, there can be a session, starting from the time a customer logging into a Web site to the time the customer logging out of the site. In that session, there can be a sub-session where the customer is buying a product, and another sub-session on supporting the customer on another product.

In yet another embodiment, the descriptor also includes a generalization 506 of the interaction. One generalization relates to the subject matter, 550, of the interaction. There are different methods to extract the subject matter, which can be a form of categorizing the interaction. One method can include standard grammatical and semantic analysis to identify concepts in the content of the interaction. Based on the concepts, the interaction can be categorized. Such techniques have been described, for example, in natural-language processing articles, and should be known to those skilled in the art.

In one embodiment, the subject matters are predetermined based on a corporation's objectives or interests. This is the corporation that owns or operates the embodiment. In another embodiment, this is the corporation that pays to have different embodiments described working, or pays to allow users to use the different embodiments described. Specific categories can be formed based on the interests of the corporation. As an example, subject matters can be related to learning, buying and paying for, getting, using and getting support for different products of the company. An interaction, after analysis, can be linked to one of the subject matters.

Another generalization is related to an interest, 552, of the source of the interaction, as identified from the interaction. This source can be the person who initiates the interaction. Again, the interest can be found through analyzing grammatically and semantically the interaction to categorize it appropriately. Note that user's interests in the interaction can be different from corporate subject matters. For example, a user is interested in getting a diaper genie whose cap is designed to be opened by a left-handed person. However, there is no such categorization in the subject matters because the corporation does not think that there is such an interest. But the user is interested in such features. Thus, categories or concepts in the user interest area can be different from those in the subject matter area.

Yet another generalization can be related to the state, 554, of the person behind the interaction, such as her emotional state, or her sense of urgency. This can be identified by analyzing the interaction using natural language processing techniques. For example, if the user uses words in his email, such as, "I have been waiting an hour for your support personnel on the phone." Probably, he is in a frustrated mood. If he said, "I need the hammer now", probably his sense of urgency is high.

Note that the generalizations and the interaction records do not have to co-exist simultaneously. In one embodiment, a descriptor can have both of them logically. For example, a descriptor can have an interaction record initially. Then, at a later time, a generalization is produced from the record, and the record can be subsequently deleted.

In another embodiment, the descriptor also includes a mode-of-communication entry 508. It can be one or more entries specific to a specific mode of communication, and can be set by an administrator. For example, the interaction includes a video conference. A system administrator can set up specific entries in the descriptor for that type of interaction.

In one embodiment, descriptors are in a common form or format. For example, the first 500 bytes are for the interaction record. Within that 500 bytes, the first 16 bytes are reserved for the source identifier, and the next 16 are for the recipient identifier, and so on.

A descriptor can be represented in a table format. The following is an example:

Attributes Values

Source identification Dan the Courageous (the name of a person)

Recipient identification 12.147.15.16 (an IP address)

Language English

Subject matter Entrepreneur

Start time of the 3:31:42 interaction

Start date of the Dec. 28, 2001 interaction

And other . . . . . .

In one embodiment, the descriptors have the same format to allow the descriptor analyzer to analyze them together. For example, with the descriptors in the same format, one can ask whether the source identification (Sid) of interaction A is equal to that of interaction B as follows:

$$Sid\ (I_A) = Sid\ (I_B)\ ?$$

Also, in one embodiment, a descriptor has an attribute related a generalization of the corresponding interaction, and has a value for one its attributes.

Figure 10:
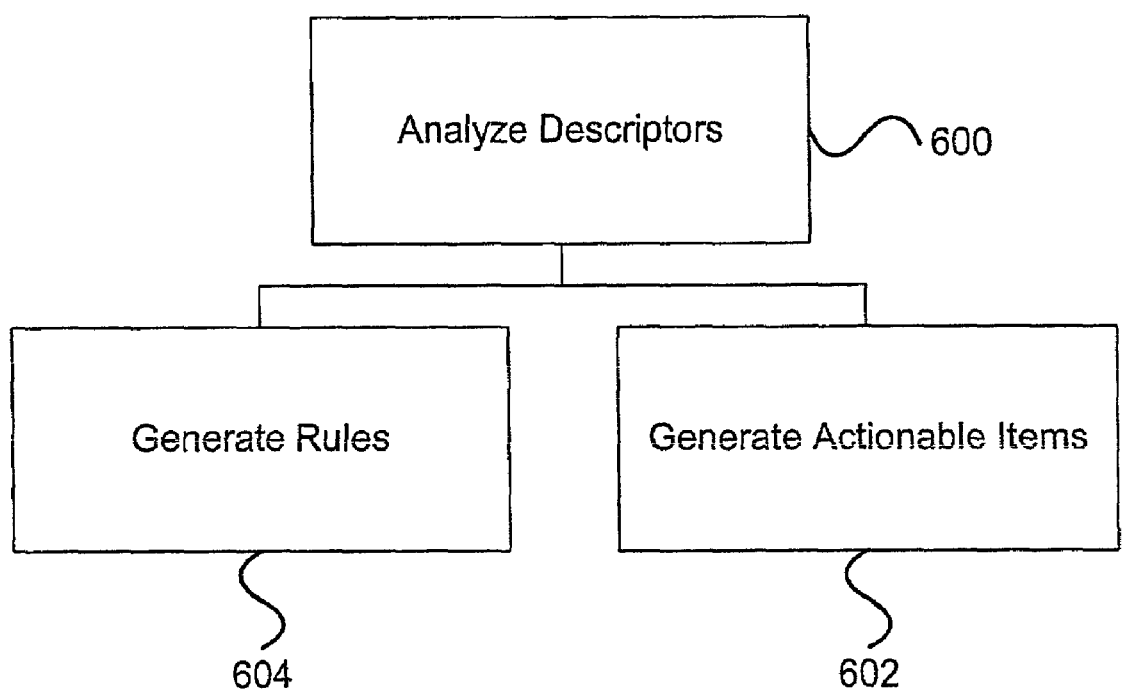
FIG. 10 shows examples of results from analyzing descriptors in the present invention.

The descriptor analyzer can analyze the descriptors, or the values associated with attributes in the descriptors, to have an understanding of one interaction, or a number of interactions in aggregate. FIG. 10 shows examples of results from analyzing the descriptors, 600. Based on the analysis, the action generator can generate actionable items, 602. The action generator can also generate rules or combinatorial rules automatically, 604. In another example, the generator can generate rules, which lead to actionable items.

Rules can be generated from features in the descriptors. As an example, a company has an east cost distributor and a west coast distributor. During the previous three months, I. From the east coast customers, one set of descriptors indicate that more than 90% of the interactions are on the newly introduced camping gear model ABC. More than 80% of the interactions are through emails or phone calls to call centers. More than 70% of the emotional state of the interactions is frustrated. Such information can be collected based on analyzing values in different attributes of the descriptors. For example, one subject matter attribute designates camping gear model ABC. To get the 90% number, the analyzer can divide the total number of interactions with that subject matter by the total number of interactions during the previous three months.

II. From the west coast customers, another set of descriptors indicates again that more than 90% of the interactions are on the newly introduced camping gear model ABC. More than 75% of the interactions are through self-help query boxes on their Web sites. More than 80% of the interactions do not clearly show their emotional state.

The analyzer analyzes the two sets of descriptors together because they are under the same subject matter. The analyzer has one prior rule:

If an interaction does not show frustration, the corresponding user is not frustrated. Based on this rule, more than 80% of the west coast users are not frustrated. The fact pattern becomes:

>70% of a group of users are frustrated, and 80% of them use email or phone calls.

>80% of a group of users are not frustrated, and 75% of them use self-help query box.

The analyzer can then analyze the fact patterns and create the following rules:

Frustrated customers are more inclined to use emails, or phone calls to call centers.

Non-frustrated customers are more inclined to use self-help query boxes on Web sites.

In another example, Jane asked a question on credit card payment terms through the natural language search system in the self-help query box; and after some time, she asked a similar question through email. By analyzing both descriptors together, the analyzer can draw the following conclusion:

The natural language search system in the self-help query box needs improvement in responding to questions regarding credit card payment terms.

Generating such rules based on the descriptor information should be known to those skilled in the art, and will not be further described.

As another example, based on analyzing a number of descriptors, one can make specific business decisions. The following are observations from descriptors:

(a) Users who have spent more than 30 minutes learning about the LawnMower Model Z81 do not buy that model. In this example, descriptors have attributes on duration of interaction, and subject matter on products and whether customers buy the products. So, the above observations can be made.

(b) More than 90% of users who spent more than 30 minutes learning about a lawnmower other than the LawnMower Model Z81 buy that model.

(c) More than 90% of users who have bought LawnMower Model Z81 spends more than two hours on support.

(d) Less than 2% of users who have bought lawnmowers other than LawnMower Model Z81 spends more than two hours on support.

Based on the above fact patterns extracted from the descriptors, the analyzer can draw the following conclusions:

From (a) and (b), the more one knows about LawnMower Model Z81, the less chance of him to buy it. From (c) and (d), LawnMower Model Z81 needs more support than other lawnmowers. Managers in the company may then decide that LawnMower Model Z81 is defective and may stop carrying it.

An administrator for a corporation can also add different rules into the action generator. For example, the corporation just introduces a new type of grass cutter. The corporation can add in the rule that any customer asking for lawn mower in the next 60 days would also get an advertisement of that grass cutter. Such rules can then be passed onto one or more facilitators through the interaction enhancer.

The interaction enhancer can generate an actionable item for improving or modifying future interactions. This can be through parametric or non-parametric adjustment.

An example of parametric adjustments is that before analyzing the descriptors, when consumers ask for product information, a company through a facilitator, provides them with information on Toyota Camry first and then Toyota Corolla. However, analyses from many descriptors indicate that more than 50% of consumers are looking for Corolla, and only 10% for Camry. In the future, when consumers ask for product information, the facilitator can adjust so that information on Corolla is displayed before Camry. This can be done automatically, such as having the interaction enhancer automatically changing weights for a key word search engine in the facilitator. Similarly, one can change weights in a natural-language response system so that responses for Toyota Corolla are of higher priority than responses for Toyota Camry. Results on Corolla can then be presented before those related to Camry. In another example, the change can be done manually by an administrator.

An example of non-parametric adjustment is through adding content to the knowledge base of natural language search engines in facilitators. For example, if more than 50% of users asking about fax machines do not select any of the responses, the facilitators should modify the content in the knowledge bases regarding fax machines.

Another type of actionable items can be in generating reports on the interactions. In one embodiment, a user can enter requests into the report generator to get different types of reports regarding the interactions. This can be done through a parametric search engine where the user can enter into the system different parameters to get different reports. To customize reports, one can add new fields. For example, one can add a field in the report that matches and tracks all user profiles and their cellular numbers. Referring back to the previous example on Camry, if the report to the administrator indicates that Camry is not that popular, he can enter a rule into the report generator. As explained above, the rule can modify future interactions, such as through the interaction enhancer, to de-emphasize Camry in future responses.

The reports can be in standard relational database format, or the reports can provide a three dimensional views of the data. In one embodiment, the report generator can be an off-the-shelf product, coupled to the analyzer to produce reports.

A third type of actionable items can be in changing the mode of communication in view of the analysis. For example, a descriptor indicates that a user is quite frustrated. The company might want to escalate the interaction to a human representative to call that specific user on issues described in the interaction. The human representative can be a service representative or an expert in the area of interest of the user. In another approach, the escalator can send a trouble-ticket to a call center. This can then lead to a service representative contacting the user through voice over Internet Protocol, instant messaging, chat in a Web collaboration environment, or just through the telephone. To improve customer satisfaction, before the human representative contacts the user, the representative can receive all prior communications with the user in the last two weeks, and other personal information related to the user that would be helpful to the representative. At least, the user does not have to re-convey all of his prior messages to the representative again. In one approach, this escalation is performed through XML. The escalator can consolidate prior interactions into an XML document, and select another mode of communication for the user. Then, the escalator guides the user to the other mode of communication, along with the XML document. In another embodiment, the escalator can direct the user to a third parties' Web site if it is more appropriately for the third party to resolve the issue.

The response to an escalation can be sent at a later time and through different means. For example, the human representative is activated to call the customer regarding his question. He cannot locate him, and leaves a message. The customer does not call back. Later, a modified answer to his question is generated electronically. This modified answer can be in view of the customer's frustration, or can be in view of frustrations as shown by a number of interactions with similar the similar question. The escalator keeps track of that customer not calling back. When the modified answer becomes available electronically, the escalator can automatically send an email to the customer, asking him if he wants a more appropriate answer to his question through email. If his response is yes, the escalator can automatically send him the modified answer.

In one embodiment, the analyzer can also analyze values associated with the mode of communication entry. These can be specific entries or new entries for data not normally categorized in the existing entries of the descriptors. These specific or new entries can be set by an administrator.

One embodiment includes a security module. This module can be for user level security. It controls the identity or the type of administrators or users that can access and/or update different sets of data. The module can also provide a higher level security, such as controlling the one or more users authorized to change the identity or the type of users that can access and/or update data. In another example, the module is for system level security. It can control the one or more users who can change the configurations of the systems, such as the operating parameters of the report generator or the descriptor generator.

As described, interactions can be based on sound, with voice recognition techniques converting the sound into representations to be analyzed. Interactions can be based on images, with pattern recognition techniques again converting them into representations to be analyzed. In another embodiment, the present invention is also applicable to interactions based on smell, tactile or taste. Similarly, those interactions are converted into representations that can be more efficiently analyzed. For example, pressure sensors can be used to digitize tactile interactions to be analyzed.

One embodiment of the invention is implemented as a Web service by an application service provider. For example, a facilitator, administered by a company, facilitates and stores interactions with their customers, employees and partners. The interactions can be represented in XML format, and transported between the provider and the company in SOAP protocol. An interaction processor and an action generator reside in an application service provider. Through the Internet, the company sends the interactions to the provider, or the provider may just access the interactions from the company's storage media. After processing and again through the Internet, the provider sends actionable items with analysis results to the company, or the company may just access the analysis results from the provider.

In yet another embodiment, all of its components are localized. For example, the embodiment is implemented through software. The source code is separated into two sections. One is related to specific languages, and the other is language independent. To localize the source code for a different language, one only needs to modify the section related to languages.

In one embodiment, components can be written in Java, with the data representation in XML. Rules can be in Java objects, and interfaces among components can be in XML format.

Based on the embodiments, corporations will have a better understanding of their customers, and will have significantly better and more consistent systems to interact with their customers. Sales, service and marketing functions will be able to better work together in presenting a single face to customers through different touch points or devices, across a corporation's relationship network.

Many of the embodiments use customers as examples. However, the present invention is also applicable to employees, vendors and partners. Based on the present invention, corporations, partners and vendors would be able to better work together in multi-parties, many-to-many interactions.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A computer-implemented method for processing online interactions, said method comprising:
   accessing two online interactions;
   generating two interaction descriptors from the two online interactions using grammatical and semantic processing; and
   analyzing the two descriptors together to determine a piece of information related to the interactions;

wherein the two interactions are from different time frames, wherein one descriptor includes a generalization of the corresponding interaction, and wherein the two interactions are from different modes of communication.

2. A computer-implemented method as recited in claim 1 wherein one interaction is an instant message, and the other interaction is an email.

3. A computer-implemented method as recited in claim 1 wherein one interaction is from a mobile device and the other interaction is from a desktop device.

4. A computer-implemented method as recited in claim 1 wherein the two interactions are from two physical locations.

5. A computer-implemented method as recited in claim 1 wherein the two interactions have two different transport protocols.

6. A computer-implemented method as recited in claim 1 wherein the two interactions have two different data formats.

7. A computer-implemented method as recited in claim 1 wherein the two interactions are in two different languages, and the method further comprises normalizing the two interactions into one language.

8. A computer-implemented method as recited in claim 1 wherein at least one of the interactions includes a pre-determined representation, and the method further comprises normalizing the pre-determined representation into a standard representation.

9. A computer-implemented method as recited in claim 1 wherein one descriptor includes at least a part of the corresponding interaction.

10. A computer-implemented method as recited in claim 1 wherein one descriptor includes an identifier for identifying the corresponding interaction.

11. A computer-implemented method as recited in claim 1 wherein a corporation pays for the computer-implemented method, wherein the generalization is related to a subject matter of the corresponding interaction, and wherein the subject matter is related to an interest of the corporation.

12. A computer-implemented method as recited in claim 1 wherein a person initiates one of the interactions, the generalization is related to an interest of the person, and the interest is extracted from the interaction.

13. A computer-implemented method as recited in claim 1 wherein a person initiates one of the interactions, and the generalization is related to the state of the person.

14. A computer-implemented method as recited in claim 1 further comprising facilitating the interactions before accessing the interactions.

15. A computer-implemented method as recited in claim 1 wherein the piece of information includes a rule generated based on the two interactions.

16. A computer-implemented method as recited in claim 1 wherein the piece of information enhances future interactions.

17. A computer-implemented method as recited in claim 1 wherein the piece of information is for generating a report related to the interactions.

18. A computer-implemented method as recited in claim 1 wherein the piece of information is for changing the mode of communication of one of the interactions.

19. A computer-implemented method as recited in claim 1 wherein future interactions can be modified based on an input from a user who has accessed the piece of information.

20. A computer-implemented method as recited in claim 1 wherein one interaction includes a statement and a response to the statement, wherein based on the piece of information, a human representative is activated to call the initiator of that interaction, wherein based on the piece of information, the response to the statement is modified, and wherein the modified response is sent to the initiator.

* * * * *